United States Patent [19]

Brown

[11] E Patent Number: Re. 32,698

[45] Reissued Date of Patent: Jun. 21, 1988

[54] ORTHOTIC INSERT

[75] Inventor: Dennis N. Brown, Blaine, Wash.

[73] Assignee: Northwest Podiatric Laboratories, Inc., Blaine, Wash.

[21] Appl. No.: 849,383

[22] Filed: Apr. 3, 1986

Related U.S. Patent Documents

Reissue of:

[64] Patent No.: 4,439,934
Issued: Apr. 3, 1984
Appl. No.: 352,708
Filed: Feb. 26, 1982

[51] Int. Cl.[4] ..... A43B 13/38; A43B 13/41

[52] U.S. Cl. ..... 36/44; 36/76 C; 12/146 M; 12/146 S; 128/614; 428/408

[58] Field of Search ..... 36/44, 43, 76 C; 12/146 M, 146 S, 146 B, 146 BR; 428/408; 264/223; 128/595, 614

[56] References Cited

U.S. PATENT DOCUMENTS

| | | | |
|---|---|---|---|
| 2,173,967 | 9/1939 | King | 36/76 C |
| 2,644,250 | 7/1953 | Ciaio | 36/76 C |
| 4,023,801 | 5/1977 | Van Auken | 428/408 X |
| 4,186,499 | 2/1980 | Massok, Jr. et al. | 36/44 |
| 4,231,169 | 11/1980 | Toyama et al. | 36/44 X |
| 4,368,234 | 1/1983 | Palmer et al. | 428/408 X |

FOREIGN PATENT DOCUMENTS

| | | | |
|---|---|---|---|
| 1489605 | 10/1977 | United Kingdom | 36/44 |
| 1521682 | 8/1978 | United Kingdom | 36/44 |

*Primary Examiner*—James Kee Chi
*Attorney, Agent, or Firm*—Hughes, Cassidy & Multer

[57] ABSTRACT

An orthotic insert for use in various types of foot gear consisting of a first blank and a second blank fused together. The first blank is a flexible pad generally contoured to the bottom of a person's foot and the second blank is more rigid and contoured to the calcaneal and arch regions of a specific individual's foot. In combination the first and second blank form an orthotic insert which offers support to and is resiliently deformable in the heel area and flexible in the toe area thus emulating the requirement of the human gait cycle.

33 Claims, 1 Drawing Sheet

ORTHOTIC INSERT

Matter enclosed in heavy brackets [ ] appears in the original patent but forms no part of this reissue specification; matter printed in italics indicates the additions made by reissue.

BACKGROUND OF THE INVENTION

The present invention relates generally to orthotic inserts for use in conjunction with various types of footwear.

The following patent application deals with developments concerning applicant's own U.S. Pat. No. 3,995,002 issued Nov. 30, 1976, U.S. Pat. No. 4,237,626 issued Dec. 9, 1980 and application Ser. No. 294,306 filed Aug. 19, 1981.

The first citation teaches the use of an orthotic casting system whereby a slipper mold is taken of the plantar surface of an individual's foot which, when the mold is cured, provides a negative template from which a positive cast can be fabricated. The final insert is then constructed using the positive cast to emulate the plantar surface of the individual's foot.

The second of applicant's patents cited teaches the use of a heel cup insert which is deformable and which can take an impression of the plantar surface of the heel and maintain that contour when cured so that the angulation of the calcaneal area can be adjusted to correct for rear foot varus or valgus.

The application cited provides a significant time saving in the ortho-casting process because it eliminates the necessity of making a negative mold from which the positive insert is constructed. Instead, the original mold itself becomes the insert. By eliminating a time consuming and labor intensive step custom fit orthosis can be created quickly and at a reduced cost.

The instant application represents a significant and novel improvement over the art disclosed in the above citations. Although a process may be somewhat the same as that described in applicant's U.S. Pat. No. 3,995,002, the materials employed in the instant application exhibit certain synergistic characteristics that further enhance desirable effects in a new, novel and unobvious manner.

The structure disclosed herein employs the orthocasting method in applicant's U.S. Pat. No. 3,995,002 to form a negative mold or slipper cast from which a positive cast of the plantar surface of an individual's foot is formed. Using this positive cast as a template, an orthotic insert is formed to underlie the area under the foot from the calcaneal area forward to the first metatarsal head, including the arch area, and from there laterally to the distal side of the foot or fifth metatarsal head. The insert itself is fabricated by applying to the positive cast a fiberglass and resin wafer selectively impregnated between layers having graphite fibers. The insert is then heat cured and cut to the limits of the cast. This is significant because of the unexpected benefits associated with the resulting structure due to the order and direction in which they are laminated together. The flexing characteristics of the insert, which are integral to its performance, can be beneficially controlled by adjusting the placement, amount, and direction of the graphite fibers impregnated between the layers of resin and fibre glass. The insert formed using the structure disclosed herein is extremely lightweight and relatively thin in comparison and is even more tuneable to the person's foot and activities because flex and rigidity can be adjusted over different areas of the insert to emphasize certain orthotic needs and compensate for certain orthotic abnormalities. If orthotic adjustment is painful to the patient because of excessive rigidity in a particular portion of that orthotic then it can be initiated gradually by introducing a further insert with a preferred zone of accentuated flexibility in the appropriate area, while maintaining a preferred rigidity throughout the remainder of the insert. This is accomplished by varying the configuration of the impregnated graphite and the thickness of the resinous core.

SUMMARY AND OBJECTS OF THE INVENTION

Accordingly, it is a primary object of the present invention to provide a novel orthotic insert device in which the flexibility of the insert can be beneficially controlled and altered in specific zones to conform to the podiatric requirements of each individual person.

It is a further object of the present invention to provide a novel orthotic insert device which can flex and dissipate stress differentially according to the activity for which it was designed.

It is a still further object of the present invention to provide a novel orthotic insert device which gives the podiatrist, the athlete, and the general consumer a whole new range of control to beneficially adjust and tune one's foot gear to one's requirements and activities.

It is another object of the present invention to provide a novel orthotic insert device which is extremely lightweight and lends itself well to mass production techniques.

It is still another object of the present invention to provide a novel orthotic insert device which is relatively rigid in the heel and arch areas for support and alignment and relatively flexible in the toe area and ball of the foot to allow for easy execution of the later phases of the gait cycle.

A further object contemplates providing a device of the character described above which can exhibit varied resistance to leading along its surface as a function of its composition.

These and other objects will be made manifest when considering the following detailed specification when taken in conjunction with the appended drawing figures.

BRIEF DESCRIPTION OF THE DRAWING FIGURES

DESCRIPTION OF THE PREFERRED EMBODIMENT

Figure 1:
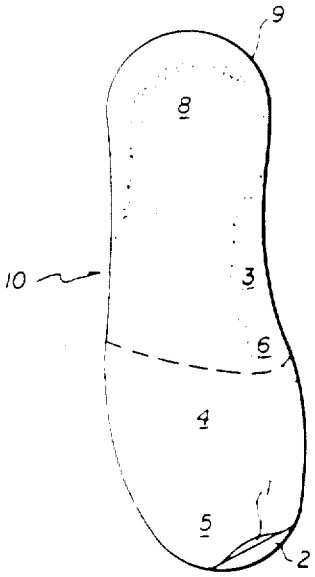
FIG. 1 is a top view of the first blank where the dotted line shows the positioning of the second blank beneath.

Referring now to the drawings in detail wherein like reference numerals represent like parts throughout the several figures, reference numeral 10 refers generally to a two-layered first blank which is generally configured in the outline of the bottom of an individual's foot, and 20 refers to the second blank.

As shown in FIG. 1, the first blank includes layer 1 of a cloth material such as nylon, Dacron, cotton or the like which is abrasion resistant and absorbs perspiration well. A second layer 2 is a thin flexible layer of rubber or neoprene or the like which is coextensive with and adhered to the first layer 1. The two layers together 1 and 2 form a first blank 10 which with second blank 20 forms an entire insert 30.

The blank 10 has the shape generally conforming to one's foot with a calcaneal or heel area 8, an area underlying the arch 3, an area underlying the ball of the foot 4 and a toe area 5.

Figure 2:
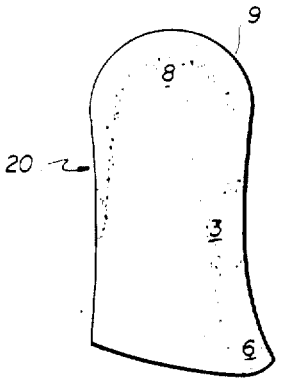
FIG. 2 is a top view of the second blank.

FIG. 2 shows a second blank generally referred to by reference numeral 20, which is designed to underlie the first blank 10 from the calcaneal area 8 to the arch area 3 and terminate at the first and fifth metatarsal head 6 as shown by the dotted line in FIG. 1.

The first blank 10 and the second blank 20 become annealed or fused together after the second blank 20 has been custom formed to the individual's foot.

After the second blank 20 becomes contoured to the portion of the foot which it underlies, by a process to be described hereinafter, it is relatively rigid compared to the first blank 10 which must remain flexible. This is because during the human gait cycle the stress of the body weight is initially placed on the rear foot and then the weight is shifted forward through the sub-talar joint and mid-tarsal joint onto the metatarsal heads and finally through the toes. The first ray (first metatarsal) 6 is prime mechanism from which one propels himself forward. The first ray 6 must remain stable for this to occur efficiently. This stability is predicated upon a locked mid-tarsal joint and adequate muscular assistance. Thus, the insert may be relatively rigid beneath the calcaneal area 8, the arch area 3 and the first metatarsal head area 6, but must remain flexible in the ball of the foot area 4 and the toe area 5 so that the entire footgear can bend during the later part or toe roll segment of the gait cycle.

The rigidity of the insert beneath the first metatarsal head area 6 helps stabilize this area during propulsion thus preventing such abnormalities as Hallux valgus (bunion) and plantar callosities which may result from inadequate stabilization of the first ray during propulsion. Therefore, the shape and rigidity of the second blank 20 lends support and stabilization to the foot at the chief site of propulsion 6 and the flexibility of the first blank 10 allows the forefoot and the associated footgear to flex during the later stages of the gait cycle.

Figure 3:
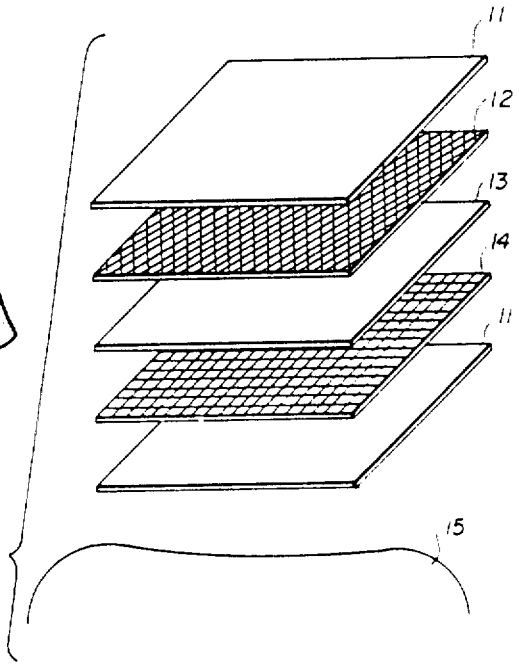
FIG. 3 is a perspective view of the layers comprising the second blank and the positive cast upon which they are contoured.

The second blank 20 can be formed and contoured around a positive cast obtained using the method and apparatus disclosed in applicant's U.S. Pat. No. 3,995,002. However, alternative layers of fiberglass, resin, and graphite, from which the second blank 20 is formed, are layed upon the positive cast thus contouring the shape of the second blank 20. As shown in FIG. 3, the second blank 20 is constructed from a plurality of layers. A first layer 11 is preferably a sheet constructed from a cloth such as fiberglass or nylon mesh and impregnated with resin. A second layer 12 can be a sheet of graphite with the woven graphite fibers running preferably diagonally from corner to corner. A next layer 13 is also a glass and resin sheet which may be the same as the first sheet 11 or may be a different thickness or contain a different percentage of resin. A next layer 14 can be a graphite sheet with the woven graphite fibers running orthogonally to the sides of that layer. A bottom layer 11 maybe a glass and resin sheet similar to the top layer 11. These various layers are applied to a positive cast 15 formed as in U.S. Pat. No. 3,995,002 so that the final lamination will replicate the contours of the positive cast 15. It should also be noted that the second blank 20 can be formed from as few as three layers such as layers 11, 12 and 13. Furthermore, once the second blank 20 is contoured, it forms a peripheral lip 9 around the heel area which cups the heel when load is brought to bear on the insert 30. Thus, the insert 30 beneficially deforms to grasp and support the calcaneal area.

Figure 4:
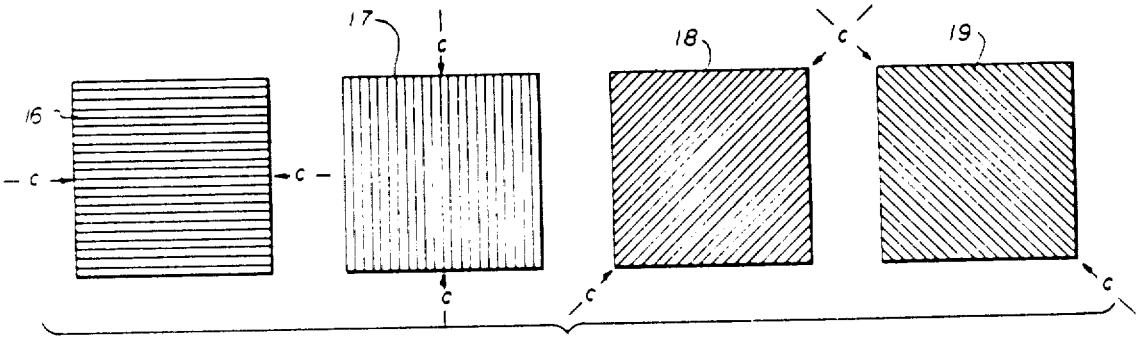
FIG. 4 is a series of top views of the graphite layers indicating the various directions in which the graphite fibers may be configured.

The graphite layers 12 and 14 can be formed with the graphite fibers running in a variety of different directions, as shown in FIG. 4. Alternately, the graphite layers 12 and 14 can appear with the fibers interwoven into a grid as shown in FIG. 3. If the graphite layer is configured with the graphite fibers running horizontally (16 FIG. 4), then the blank 20 will tend to flex more readily about the axis parallel to the fibers, line C. Similarly, the fibers can be arranged in any direction to create a series of axes about which the insert will flex more readily, 17, 18 and 19 FIG. 4. Thus, the arrangement and configuration of the fibers relative to themselves and relative to the glass and resin layers determines the amount and direction of the flexibility of the completed insert 30. Furthermore, if preferred zones of rigidity or flexibility are desired, the configuration, and the number of the graphite layers can be varied to achieve the desired effects. For example, the insert 30 may require arch and heel posts 21 FIG. 5 in order to properly support the foot and provide a proper transition from the insert 30 to the footgear. The posts 21 also provide a means to limit motion in the subtalar joint and in so doing the post determines the position of the calcaneus to the ground (supporting surface).

Figure 5:
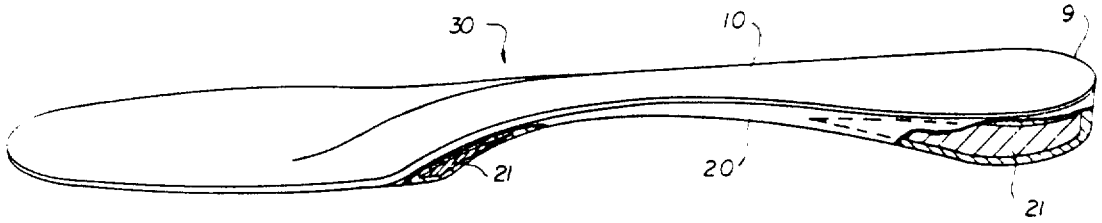
FIG. 5 is a perspective view of the finished insert with cutaway sections.

After the second blank 20 has been formed to the specific contours of the individual's foot as described above, it is best cured at 350° for 45 minutes and then it is ready to be fixed to the bottom of the first blank 10 to create the final insert 30, as shown in FIG. 5.

Having thus described the preferred embodiment of the invention, it should be understood that numerous structural modifications and adaptations may be resorted to without departing from the spirit of the invention.

What is claimed is:

1. An insert removeably placed within a finished article of footwear comprising, in combination:

a full length first blank dimensioned to underlie the plantar surface of a person's foot amd formed of flexible, resiliently deformable material along its entire extent, a second blank extending from a calcaneal area of the person's plantar surface to a metatarsal head area bonded to a bottom face of said [front] *first* blank and formed from alternating layers of fiberglass/resin and graphite, two of said fiberglass/resin layers forming outer most surfaces of said second blank, said second blank molded and set to conform identically to the plantar surface of the person's foot along the areas of support therefor when the foot is beneficially oriented, each said graphite layer formed from a bundle of graphite fibers directionally oriented along specific axes to provide controlled, preprogrammed deformation of said insert when used in a gait cycle, whereby said insert nests within the inner portion of the finished footwear article and provides continuous control of weight distribution to the foot by insert distortion as the weight is shifted from the calcaneal area forward through the subtalar and midtarsal joint and thence to the metatarsal heads.

2. The device of claim 1 including posts encapsulated within said second blank oriented to alter the deformation pattern of said second blank during use of said insert.

3. The device of claim 2 wherein said post is placed in an arch area of said insert.

4. The device of claim 2 wherein said post is placed at the calcaneal area of said insert.

5. The device of claim [4] *1*, wherein said graphite layer includes a bundle of graphite fibers disposed in a longitudinal direction relative to the longitudinal axis of said insert.

6. The device of claim [4] *1*, wherein said graphite layer is disposed such that said graphite are oriented transverse to the longitudinal axis of the insert.

7. The device of claim [4] *1*, wherein said graphite layer is formed and oriented such that its bundle fibers are pointed diagonally relative to the longitudinal and latitudinal aspects of said insert.

8. The device of claim [7] *1*, wherein plural graphite layers are provided.

9. The device of claim [4] *1*, wherein said graphite layer is formed from a plurality of strands uniformly equidistant one from the other along its entire layer.

10. A method for forming an orthotic device to be removeably placed in finished footwear such as shoes or the like comprising the steps of:

providing a first blank and dimensioning said first blank to underlie a plantar surface of a person's foot, providing a second blank extending from a metatarsal head area to the calcaneal area of a person's foot, forming said first blank from a resilient pad which underlies an abrasion resistant and perspiration dispersing layer, forming said second blank from alternate layers of resin impregnated mesh and graphite bundles, orienting said graphite bundles in appropriate directions to encourage deflection of said insert in certain areas and retard deflection in other areas, heating said insert to render deformable said insert, providing a mold of the plantar surface of the person's foot, positioning said first blank against the mold, positioning said second blank against said first blank, applying force on said insert against the mold to deform said insert thereto exactly, and allowing said insert to set, whereby said insert not only replicates the contour of the mold and therefore the person's plantar foot surface but also controls and supports foot flexure in a preprogrammed manner by the graphite bundle orientation.

11. The method of claim 10 including placing a post within said second blank between a layer of resin impregnated mesh and a graphite bundle layer.

12. The method of claim 11 including placing a post within the arch area of said second blank.

13. The method of claim 11 including placing said posts adjacent a calcaneal area.

14. The method of claim [12] *10*, including orienting said graphite bundle layer such that the bundles are directed in a longitudinal direction relative to said insert.

15. The method of claim [14] *10*, including orienting the bundles traverse to the longitudinal axis.

16. The method of claim [15] *10*, including orienting the bundles in a diagonal manner relative to the longitudinal and latitudinal aspects.

17. The method of claim [16] *10*, including curing the insert using heat and pressure at 350° for forty-five minutes.

*18. An insert removably placed within a finished article of footwear comprising:*

*a first blank dimensioned to underlie a plantar surface of a person's foot and formed of flexible resiliently deformable material along its entire length, and extending from a calcaneal area to at least a metatarsal head area of the plantar surface, and extending laterally across substantially an entire width of the plantar surface;*

*b. a second blank extending from said calcaneal area to said metatarsal head area and being bonded to a bottom face of said first blank, said second blank comprising layers of resin and graphite, with the second blank extending laterally cross substantially an entire width of the plantar surface;*

*c. said second blank molded to and set to conform identically to the plantar surface of the person's foot along areas of support therefor when the foot is beneficially oriented in a manner that a midfoot portion of the second blank is particularly positioned relative to a rear portion of the second blank to properly orient a midfoot portion of the plantar surface of the foot relative to a calcaneal area of the foot;*

*d. said second blank comprising at least one graphite layer formed from a bundle of graphite fibers which are bonded to one another to form a relatively rigid structure and which are directionally oriented along a specific axis so as to have greater resistance to bending along a direction parallel to said axis and less resistant to bending along a direction transverse to said axis, to provide controlled, preprogrammed deformation of said insert when used in a gait cycle;*

*whereby said insert is able to nest within an inner portion of the finished article of footwear to provide continuous control of weight distribution to the foot by insert distortion as weight is shifted from the calcaneal area forward through subtalor and midtarsal joints of the foot and thence to midtarsal heads of the foot.*

*19. The insert as recited in claim 18, further comprising at least one post encapsulated within said blank, said post oriented to alter a deformation pattern of said second blank during use of said insert.*

*20. The insert as recited in claim 19, wherein said post is placed in an arch area of said insert.*

*21. The insert as recited in claim 19, wherein said post is placed at a calcaneal area of said insert.*

*22. The insert as recited in claim 18, wherein said graphite layer has said bundle of graphite fibers disclosed substantially along a longitudinal axis which is parallel to a lengthwise axis of the person's foot.*

*23. The insert as recited in claim 18, wherein said graphite layer includes a bundle of graphite fibers disposed in a direction slanted to a longitudinal axis which is parallel to a lengthwise axis of the person's foot.*

24. The insert as recited in claim 18, wherein there is a plurality of graphite layers.

25. The insert as recited in claim 24, wherein each of said graphite layers is formed from a plurality of strands substantially uniformly equidistant from one another.

26. The insert as recited in claim 18, wherein said graphite layer is formed from a plurality of strands substantially uniformly equidistant from one another.

27. A method for forming an orthotic insert to be removably placed in finished footwear such as shoes or the like comprising the steps of:

a. providing a first blank and dimensioning said first blank to underlie a plantar surface of a person's foot and extending laterally across substantially an entire width of the plantar surface;

b. providing a second blank extending from a metatarsal head area to the calcaneal area of a person's foot with the second blank extending laterally across substantially an entire width of the plantar surface;

c. forming said first blank from a resilient pad which underlies an abrasion resistant and perspiration dispersing layer;

d. forming said second blank from layers of resin and graphite, with said graphite layer comprising a bundle of graphite fibers, orienting said graphite fibers in a direction to encourage deflection of said insert in certain areas and retard deflection in other areas;

e. heating said insert to render deformable said insert;

f. providing a mold of the plantar surface of the person's foot;

g. positioning said first blank against the mold;

h. positioning said second blank against said first blank in a manner that a midfoot portion of the second blank is particularly positioned relative to a rear portion of the second blank to properly orient a midfoot portion of the plantar surface of the foot relative to a calcaneal area of the foot;

i. applying force on said insert against the mold to deform said insert thereto exactly;

j. and allowing said insert to set, with said graphite fibres being bonded to one another to form a relatively rigid structure;

whereby said insert not only replicates the contour of the mold and therefor the person's plantar foot surface but also controls and supports foot flexure in a preprogrammed manner by the graphite bundle orientation.

28. The method as recited in claim 27, including placing a post within said second blank.

29. The method as recited in claim 28, including placing said post within an arch area of said second blank.

30. The method as recited in claim 28, including placing said post adjacent a calcanea area of said second blank.

31. The method as recited in claim 27, including orienting said graphite fibers such that the fibers are directed substantially in a longitudinal direction which is parallel to a lengthwise axis of the foot.

32. The method as recited in claim 27, including orienting said fibers in a direction slanted to a longitudinal axis which is parallel to a lengthwise axis of the foot.

33. The method as recited in claim 27, including curing the insert using heat and pressure of at least approximately 350° F. and for at least forty-five minutes.

• • • • •